US011742137B2

(12) United States Patent
Lindt et al.

(10) Patent No.: US 11,742,137 B2
(45) Date of Patent: Aug. 29, 2023

(54) SECONDARY-SIDED ARRANGEMENT OF WINDING STRUCTURES AND A METHOD FOR MANUFACTURING A SECONDARY-SIDED ARRANGEMENT

(71) Applicant: Bombardier Primove GmbH, Berlin (DE)

(72) Inventors: Rudolf Lindt, Mannheim (DE); Federico Garcia, Rheinhausen (DE); Robert Czainski, Doluje (PL); Dominik Anders, Mannheim (DE); Alexander Klingspor, Karlsruhe (DE)

(73) Assignee: Bombardier Primove GmbH, Berlin (DE)

( * ) Notice: Subject to any disclaimer, the term of this patent is extended or adjusted under 35 U.S.C. 154(b) by 785 days.

(21) Appl. No.: 16/471,260

(22) PCT Filed: Dec. 20, 2017

(86) PCT No.: PCT/EP2017/083782
§ 371 (c)(1),
(2) Date: Jun. 19, 2019

(87) PCT Pub. No.: WO2018/115105
PCT Pub. Date: Jun. 28, 2018

(65) Prior Publication Data
US 2020/0118739 A1 Apr. 16, 2020

(30) Foreign Application Priority Data
Dec. 22, 2016 (GB) ..................... 1621930

(51) Int. Cl.
*H01F 38/14* (2006.01)
*H01F 27/28* (2006.01)
(Continued)

(52) U.S. Cl.
CPC .............. *H01F 38/14* (2013.01); *B60L 53/12* (2019.02); *H01F 27/28* (2013.01); *H01F 27/366* (2020.08);
(Continued)

(58) Field of Classification Search
CPC .......... H01F 38/14; H01F 27/28; H01F 41/04; H01F 27/36; H01F 3/10; H01F 27/34;
(Continued)

(56) References Cited

U.S. PATENT DOCUMENTS

| 10,217,552 B2 | 2/2019 | Czainski et al. |
| 2002/0041176 A1 | 4/2002 | Eki |

(Continued)

FOREIGN PATENT DOCUMENTS

| CN | 104955674 B | 3/2018 |
| DE | 102010014281 A9 | 11/2012 |

(Continued)

*Primary Examiner* — Elim Ortiz
(74) *Attorney, Agent, or Firm* — The Webb Law Firm

(57) ABSTRACT

A secondary-sided arrangement of at least one secondary winding structure includes at least one phase line and one secondary winding structure per phase line, wherein the secondary-sided arrangement comprises at least two magnetically conducting elements, at least one lateral outer magnetically conducting element and at least one inner magnetically conducting element, wherein a width of the at least one lateral outer magnetically conducting element is larger than a width of the at least one inner magnetically conducting element and/or a length of the at least one inner magnetically conducting element is smaller than a length of the at least one lateral outer magnetically conducting element. A method for manufacturing a secondary-sided arrangement is also disclosed.

18 Claims, 3 Drawing Sheets

(51) Int. Cl.
  *H01F 41/04* (2006.01)
  *B60L 53/12* (2019.01)
  *H01F 27/36* (2006.01)
(52) U.S. Cl.
  CPC .......... *H01F 41/04* (2013.01); *B60L 2210/30* (2013.01); *B60L 2210/44* (2013.01)
(58) Field of Classification Search
  CPC .. B60L 53/12; B60L 2210/30; B60L 2210/44; B60L 2240/36; B60L 5/005; Y02T 10/70; Y02T 10/7072; Y02T 90/14; Y02T 90/12; H02J 5/005; H02J 7/025; B60Y 2200/91
  See application file for complete search history.

(56) References Cited

U.S. PATENT DOCUMENTS

| | | | | |
|---|---|---|---|---|
| 2008/0129246 | A1* | 6/2008 | Morita | B60M 7/00 320/108 |
| 2010/0072815 | A1 | 3/2010 | Hahn et al. | |
| 2011/0254503 | A1* | 10/2011 | Widmer | B60L 3/04 320/108 |
| 2012/0025605 | A1* | 2/2012 | Schneider | H01F 27/38 307/9.1 |
| 2014/0239729 | A1* | 8/2014 | Covic | H02J 50/70 307/104 |
| 2014/0253275 | A1* | 9/2014 | Shijo | H01F 27/022 336/105 |
| 2015/0077053 | A1* | 3/2015 | Stamenic | H02J 7/00302 320/109 |
| 2015/0170832 | A1* | 6/2015 | Covic | B60L 53/12 307/104 |
| 2015/0171519 | A1* | 6/2015 | Han | H02J 7/00045 343/720 |
| 2015/0236513 | A1 | 8/2015 | Covic et al. | |
| 2015/0260835 | A1* | 9/2015 | Widmer | G01S 13/04 342/27 |
| 2015/0367739 | A1* | 12/2015 | Böser | H01F 27/36 320/108 |
| 2015/0372498 | A1 | 12/2015 | Ichikawa et al. | |
| 2015/0380157 | A1 | 12/2015 | Green et al. | |
| 2016/0190814 | A1* | 6/2016 | Budhia | H02J 50/70 307/104 |
| 2017/0063128 | A1* | 3/2017 | Van Bosch | H02J 7/025 |
| 2017/0221625 | A1 | 8/2017 | Sullivan et al. | |
| 2018/0174734 | A1* | 6/2018 | Budhia | H02J 50/12 |
| 2018/0174738 | A1* | 6/2018 | Yuasa | H01F 38/14 |
| 2018/0174745 | A1* | 6/2018 | Percebon | H02J 50/10 |
| 2018/0190426 | A1 | 7/2018 | Wirth et al. | |
| 2018/0204675 | A1 | 7/2018 | Wirth et al. | |
| 2018/0309323 | A1 | 10/2018 | Klingspor et al. | |

FOREIGN PATENT DOCUMENTS

| | | | |
|---|---|---|---|
| GB | 2533367 | A | 6/2016 |
| GB | 2539885 | A | 1/2017 |
| GB | 2543344 | A | 4/2017 |
| JP | 2002110437 | A | 4/2002 |
| JP | 2014239168 | A * | 12/2014 |
| WO | 2013122483 | A1 | 8/2013 |
| WO | 2014011059 | A1 | 1/2014 |
| WO | 2014122125 | A1 | 8/2014 |
| WO | 2016022966 | A1 | 2/2016 |
| WO | 2016207290 | A1 | 12/2016 |
| WO | 2016207291 | A1 | 12/2016 |
| WO | WO-2017156499 | A1 * | 9/2017 ............ H01F 38/14 |

\* cited by examiner

SECONDARY-SIDED ARRANGEMENT OF WINDING STRUCTURES AND A METHOD FOR MANUFACTURING A SECONDARY-SIDED ARRANGEMENT

CROSS-REFERENCE TO RELATED APPLICATIONS

This application is the United States national phase of International Application No. PCT/EP2017/083782 filed Dec. 20, 2017, and claims priority to United Kingdom Patent Application No. 1621930.5 filed Dec. 22, 2016, the disclosures of which are hereby incorporated by reference in their entirety.

BACKGROUND OF THE INVENTION

Field of the Invention

The present disclosure relates to a secondary-sided arrangement of winding structures and a method for manufacturing a secondary-sided arrangement.
Technical Considerations
Electric vehicles, in particular a track-bound vehicle, and/or a road automobile, can be operated by electric energy which is transferred by means of an inductive power transfer. Such a vehicle may comprise a circuit arrangement, which can be a traction system or a part of a traction system of the vehicle, comprising a receiving device adapted to receive an alternating electromagnetic field and to produce an alternating electric current by electromagnetic induction. Furthermore, such a vehicle can comprise a rectifier adapted to convert an alternating current (AC) to a direct current (DC). The DC can be used to charge a traction battery or to operate an electric machine. In the latter case, the DC can be converted into an AC by means of an inverter.

The inductive power transfer is performed using two sets of winding structures. A first set is installed on the ground (primary winding structures) and can be fed by a wayside power converter (WPC). The second set of windings (secondary winding structures) is installed on the vehicle. For example, the second set of windings can be attached underneath the vehicle, in the case of trams under some of its wagons. For an automobile it can be attached to the vehicle chassis. The secondary winding structure(s) or, generally, the secondary side is often referred to as pick-up-arrangement or receiver or is a part thereof. The primary winding structure(s) and the secondary winding structure(s) form a high frequency transformer to transfer electric energy to the vehicle. This can be done in a static state (when there is no movement of the vehicle) and in a dynamic state (when the vehicle moves).

In particular in the case of road automobiles, a stationary primary unit comprises a plurality of elements which are often arranged spatially separated.

GB 15 11 259.2 discloses a secondary-sided arrangement of at least one secondary winding structure, wherein the secondary-sided arrangement comprises at least one phase line and one secondary winding structure per phase line, wherein the secondary-sided arrangement comprises at least one magnetically conducting element or an arrangement of magnetically conducting elements, wherein at least one section of at least one magnetically conductive element extends into the secondary winding structure or at least one subwinding structure of the secondary winding structure. The disclosed arrangement, however, has the disadvantage of providing a high flux density in the lateral outer rows of multiple ferrite bars. As a consequence, the temperature of the lateral outer ferrite bars increases by a larger amount than the temperature of the inner ferrite bars during operation which leads to a thermal disbalance and extra losses in the ferrite structure.

GB 16 07 032.8 discloses an inductive power transfer unit, wherein the inductive power transfer unit comprises at least one winding structure and at least one flux guiding means, wherein the inductive power transfer unit further comprises at least one antenna element, wherein at least one portion of the at least one flux guiding means is a part of the antenna element.

SUMMARY OF THE INVENTION

There is the technical problem of providing secondary-sided arrangement of winding structures and a method for manufacturing a secondary-sided arrangement, wherein an imbalance of the distribution of thermal stress among the magnetically conductive elements and resulting losses are minimized.

The solution of said technical problem is provided by the subject-matter of the present disclosure.

A secondary-sided arrangement of at least one secondary winding structure is proposed, wherein the secondary arrangement comprises at least one phase line and one winding structure per phase line.

The winding structure of the secondary arrangement can e.g. comprise one, two or more than two subwinding structure(s). At least one subwinding can provide a loop or a coil. The subwinding can be provided by at least one section of the winding structure. Also, the subwinding can provide or form a coil or a loop, e.g. with a predetermined number of turns, wherein the loop or coil is provided by at one or multiple section(s) of the winding structure.

A subwinding structure, in particular a loop or a coil, can be circular-shaped, oval-shaped or rectangular-shaped. Of course, other geometrical shapes are also possible.

A winding structure can be provided by one or more conductor(s). The phase line can be provided by a winding structure or vice versa.

The secondary winding structure extends along a longitudinal axis of the secondary-sided arrangement. Preferably, the secondary winding structure comprises two or more than two subwinding structures which extend along the longitudinal axis of the secondary-sided arrangement, which can be parallel to a longitudinal axis of one winding structure. In this case, successive subwinding structures of the winding structure can be arranged adjacent to one another along said longitudinal axis. Adjacent to each other can mean that central axes of the subwindings, in particular the axes of symmetry, are spaced apart from another, e.g. with a predetermined distance along the longitudinal axis. Further, neighbouring or adjacent subwindings can be counter-oriented.

The winding structure can, in particular, be provided by flat subwinding structures, in particular flat loops or coils. This means that the secondary winding structure is substantially arranged within a two-dimensional plane spanned by the secondary-sided longitudinal and lateral axes. Each subwinding structure can provide one pole of the respective phase line if the winding structure is energized with an alternating current.

The longitudinal axis of the secondary-sided arrangement denotes an axis along which the at least one subwinding structure of the at least one secondary winding structures extends. This means, that the secondary winding structures comprises at least one section which extends along said longitudinal axis. This secondary-sided longitudinal axis can be parallel to a roll axis of the vehicle. The longitudinal axis of the secondary-sided arrangement can be oriented parallel to a direction of travel of the vehicle if the vehicle drives straight forward.

In the context of the present disclosure, the following reference coordinate system can be used. A first axis, which can also be referred to as longitudinal axis or x-axis, can extend parallel to a longitudinal axis of the winding structure, e.g. the aforementioned direction of extension. A second axis, which can also be referred to as lateral axis or y-axis, can be oriented parallel to a lateral axis of the winding structure. Further, the lateral axis can be oriented perpendicular to the longitudinal axis. A third axis, which can also be referred to as vertical axis or z-axis, can be oriented perpendicular to the first and the second axes. The third axis can be oriented parallel to a desired direction of power transfer, i.e. from the primary unit to the secondary unit. The vertical axis can be oriented from bottom to top if pointing from the primary unit to the secondary unit.

In some non-limiting embodiments, the winding structure, in particular at least one or each subwinding structure, comprises at least one winding section which extends along the longitudinal axis and at least one winding section which extends along a lateral axis. The lateral and longitudinal axes can span the aforementioned plane in which the winding structure is substantially arranged. The longitudinal axis and the lateral axis can both be oriented perpendicular to a vertical axis, wherein the vertical axis can be oriented parallel to an axis of symmetry of a subwinding structure and oriented from a primary-sided arrangement towards a secondary-sided arrangement. The vertical axis can, in particular, be parallel to the main direction of power transfer. An origin of said reference coordinate system can be a geometric centre point of the winding structure or of one subwinding structure.

A length can be measures along the first axis, a width can be measured along the second axis and a height can be measured along the third axis. Directional terms referring to a direction such as "above", "under", "upper", "lower" relate to the vertical axis or z-axis. The terms "above" and "upper" refer to the side of the secondary-sided arrangement that is directed away from the primary-sided arrangement. Directional terms referring to a direction such as "outer", "inner", "beside" relate to the lateral axis or y-axis. Directional terms referring to a direction such as "ahead", "behind" relate to the longitudinal axis or x-axis.

The winding structure of the secondary-sided arrangement can have an even or uneven number of subwindings which are arranged adjacent to each other along the secondary-sided longitudinal axis.

In an aligned state of a primary-sided arrangement and the secondary-sided arrangement, a longitudinal axis of the primary-sided arrangement and the longitudinal axis of the secondary-sided arrangement can be parallel.

Further, the at least one winding structure of the secondary-sided arrangement can comprise at least one winding section which extends along a secondary-sided lateral axis which is oriented perpendicular to the secondary-sided longitudinal axis. In the aligned state, the primary-sided lateral axis and the secondary-sided lateral axis can also be oriented parallel. The secondary-sided lateral axis can be oriented parallel to a pitch axis of the vehicle.

In some non-limiting embodiments, the secondary winding structure comprises exactly two adjacent or successive subwindings. Further, a subwinding can have a rectangular shape.

The secondary-sided arrangement can be part of a secondary unit or receiving unit which can also be referred to as pick-up. The secondary unit can further comprise a rectifier, at least one compensating capacitance, means for supervising a temperature of the secondary unit, at least one control unit, e.g. a micro controller, and/or at least one communication means. The at least one communication means can be used for exchanging or transmitting data with a corresponding primary unit, e.g. via WLAN or Bluetooth™ or any other wireless communication.

The system can be designed such that an electric power of 3.6 kW can be transferred to a vehicle. The vehicle can, in particular, be an automobile. It is, however, possible that the system is designed to transfer other power levels, e.g. a power of 11 kW or 200 kW.

The winding structure of the secondary-sided arrangement can provide at least one, two or even more poles of the main electromagnetic field or of the electromagnetic field generated by the induced current. The main electromagnetic field can denote an electromagnetic field generated by the primary winding structure if said primary winding structure is energized. Preferably, the secondary-sided arrangement comprises exactly one (secondary) winding structure.

Further, the secondary-sided arrangement, in particular the winding structure, can comprise a winding head on each lateral side. A winding head is preferably arranged parallel to the longitudinal direction and connects two of the laterally extending electrical lines of the winding structure. It is possible that the arrangement comprises at least one winding head per subwinding structure. In particular, the arrangement can comprise two winding heads per subwinding structure, wherein a first winding head of a subwinding structure is arranged on a first lateral side of the subwinding structure and the further winding head is arranged on the opposite lateral side of the subwinding structure. A winding head can be arranged at a lateral side or edge of a subwinding structure or winding structure or besides a subwinding structure or winding structure along the lateral direction.

Further, the secondary-sided arrangement may comprise at least two magnetically conducting elements. One magnetically conductive element can comprise at least two magnetically conductive subelements. In particular, one magnetically conducting element can be provided by multiple magnetically conducting subelements, wherein at least a portion of one subelement abuts at least one portion of at least one other subelement.

A magnetically conducting (sub)element can also be referred to as flux guiding element. The flux guiding element is used to guide a magnetic flux of the electromagnetic field which is generated by the primary-sided arrangement. The magnetically conducting (sub)element can be a ferrite element or can comprise one or multiple ferrite element(s). Thus the magnetically conductive element as used herein can denote a structure of magnetically conducting subelements, preferably for guiding the magnetic flux from a first magnetic pole to a second magnetic pole of the secondary-sided arrangement.

The at least one magnetically conducting element or at least a portion of such an element, in particular one subelement, can be arranged above the secondary winding structure, in particular at a side of the secondary winding structure that is arranged away or faces away from the primary winding structure during a charging operation. Alternatively or in addition, the at least one magnetically conducting element or at least a portion thereof, in particular a subelement, can be arranged at least partially or fully within the plane in which one winding structure is arranged. In particular, the at least one magnetically conducting (sub)element can be arranged within or can extend into or through a volume or area enclosed by one subwinding structure of the secondary winding structure.

The at least one magnetically conducting element can extend along the longitudinal axis. In particular, the at least one magnetically conducting element and/or a subelement can be a strip-like or elongated element. In other words, the at least one magnetically conducting element and/or at least one subelement of such a magnetically conductive element, can be a bar element, e.g. a ferrite bar. This advantageously allows decreasing the magnetic flux extending away from the secondary-sided arrangement in an unwanted direction.

Further, the secondary-sided arrangement comprises at least one lateral outer magnetically conducting element. Further, the secondary-sided arrangement further comprises at least one inner magnetically conducting element.

A lateral outer magnetically conducting element can denote a magnetically conducting element which provides a magnetically conducting element at a lateral side or edge of the set of all magnetically conducting elements of the proposed arrangement.

An inner magnetically conducting element can denote a magnetically conducting element which does not provide a magnetically conducting element at a lateral side or edge of the set of all magnetically conducting elements of the proposed arrangement.

In other words, an inner magnetically conducting element can be arranged ahead of a lateral outer magnetically conducting element in a direction along the lateral axis if viewed from the origin of said reference coordinate system. Also, a magnitude of a lateral coordinate of an inner magnetically conducting element, in particular a lateral coordinate of a geometric centre or of a longitudinal axis of the inner magnetically conducting element, is smaller than a magnitude of a lateral coordinate of a lateral outer magnetically conducting element, in particular a lateral coordinate of a geometric centre or of a longitudinal axis of the lateral outer magnetically conducting element.

In particular, the secondary-sided arrangement comprises a first and a second lateral outer magnetically conducting elements. The first lateral outer magnetically conducting element and the second lateral outer magnetically conducting element provide magnetically conducting elements at opposite lateral sides or edges of the set of all magnetically conducting elements of the proposed arrangement. The at least one inner magnetically conducting element is arranged in between the first and the second lateral outer magnetically conducting element along the lateral axis. In particular, the secondary-sided arrangement comprises one, two, three or four inner magnetically conducting elements.

Preferably, a non-zero gap, in particular air gap or a gap filled with a non-magnetically conducting material, is provided between magnetically conducting elements which are arranged adjacent to one another along the lateral axis. The non-magnetically conducting material is preferably a magnetically neutral material that has little to no impact on the magnetic field. Example materials of the non-magnetically conducting material are polyurethanes, polyesters and epoxy as well as structural reinforcements such as woven or non-woven glass fibre or cloth. Each of said materials may serve different purposes. The polyurethane may serve as an adhesive member or sticking member to align the elements of magnetic material to one another in close proximity to minimize a magnetic resistance while maintaining the easy to install separation of the magnetic elements. An epoxy coating can be used to reduce the susceptibility of the magnetic material to brittle fracturing. The whole structure is arranged in cast polyurethane resin. The non-magnetically conducting material is of special importance for structures of the magnetically conducting elements of greater complexity than cuboids such as bars.

According to the present disclosure, a width of the at least one lateral outer magnetically conducting element is larger than a width of the at least one inner magnetically conducting element. In particular, the width of the at least one lateral outer magnetically conducting element is larger than maximal width of the set of the widths of all inner magnetically conducting elements.

If a width of the at least one lateral outer and/or the at least one inner magnetically conducting element varies, the maximal width of the at least one lateral outer magnetically conducting element can be larger than a maximal width of the at least one inner magnetically conducting element.

It is possible that a length of all magnetically conducting elements is equal.

Providing a larger width of the at least one lateral outer magnetically conducting element advantageously decreases a flux density in the outer magnetically conducting element, in particular of the flux portion provided or generated by the at least one winding head.

Consequently, an imbalance of the distribution of the flux density and thus of thermal stress among the magnetically conductive elements and resulting losses are minimized.

Alternatively or in addition a length of the at least one inner magnetically conducting element is smaller than a length of the at least one lateral outer magnetically conducting element. In this case, not all magnetically conducting elements have an equal length. In particular, the minimum length of the set of the widths of all inner magnetically conducting elements is smaller than the width of the at least one lateral outer magnetically conducting element.

Providing a larger width of the at least one lateral outer magnetically conducting element advantageously allows to decrease a flux density in the outer magnetically conducting element, in particular of the flux portion provided or generated by the at least one winding head. Consequently, an imbalance of the distribution of the flux density and thus of thermal stress among the magnetically conductive elements and resulting losses are minimized. Further, in comparison to an arrangement of magnetically conducting elements with equal lengths, additional mounting space, e.g. for fastening means, e.g. a screw, is provided.

In another embodiment, a magnetically conducting element is provided by a bar element. Alternatively, a magnetically conducting element comprises multiple subelements, wherein at least one of the subelements is provided by a bar element. A bar element can have a constant height along its length. In this case, the bar element can have a cuboid shape. Alternatively, a bar element can have a varying height along its length. In particular, a bar element can have at least one section with a constant height and at least one section with an increasing height. The height can be measured along the vertical axis of the secondary winding structure.

Different subelements of a magnetically conducting element can be made of the same material, e.g. a material with the same magnetic conductivity.

In some non-limiting embodiments, the arrangement of all magnetically conducting elements comprises multiple rows of subelements, wherein each row comprises one or multiple subelements. Each row extends preferably along the longitudinal axis.

This advantageously facilitates the manufacture of the arrangement of magnetically conducting elements while maintaining the desired magnetic properties of the ferrites in comparison to single row arrangements of ferrites.

In another embodiment, a magnetically conducting element comprises at least one row of at least two magnetically conductive subelements. In this case, the magnetically conducting element can comprise multiple subelements. These subelements can be arranged such that the subelements extend along the longitudinal axis. Multiple subelements can be arranged along or parallel to a straight line, wherein the straight line is oriented parallel to the longitudinal axis. Such an arrangement can also be referred to as row of subelements, i.e. bar elements. In this case, the arrangement of the multiple bar elements can extend along the longitudinal axis.

Further, these multiple subelements can abut or overlap at front end or rear end sections of the subelements. In particular, an end section, in particular a front end or rear end section, of a first subelement can overlap an end section of another subelement. In this case, an upper surface or lower surface of the first subelement can abut a lower or an upper surface of the other subelement. Alternatively, a face side, e.g. a front face side or a rear face side, of a first subelement can abut a face side of another subelement.

This advantageously provides a simple manufacture of the arrangement of magnetically conducting elements.

In another embodiment, at least two subelements of a row overlap each other at least partially. In particular, at least two successive subelements in the row overlap each other at least partially. As explained before, the at least two subelements can overlap each other at a front end or rear end section of the magnetically conductive elements.

This can mean that the at least two magnetically conductive subelements are arranged at different vertical positions along the aforementioned vertical axis. Overlapping subelements elements or overlapping portions can mechanically contact each other or abut.

This advantageously facilitates a manufacture of the arrangement of magnetically conducting elements which are adapted to the design of the secondary winding structure.

In another embodiment, at least two subelements, in particular two successive subelements of a row are aligned with a lateral offset to one another. This can mean that a non-zero distance between the longitudinal axes or geometric centres of these two subelements are provided along the lateral axis of the primary winding structure. The lateral offset can be provided along or against the lateral axis. Further, there can be no lateral offset between every second magnetically conductive subelement of the row.

The arrangement can have multiple rows, wherein a lateral offset between two successive subelements is only provided in selected but not in all rows, in particular only in rows which provide an inner magnetically conducting element. This means that the arrangement comprises one or more rows, in particular the rows providing lateral outer magnetically conducting elements, in which multiple subelements are arranged with no lateral offset and one or more rows in which at least two successive subelements are arranged with said lateral offset.

In some non-limiting embodiments, in addition to a lateral offset, a vertical offset is provided between two successive elements of one row. By providing the lateral offset, it is possible to vary, e.g. increase the gap between two adjacent rows along the lateral direction. This advantageously allows to arrange other components between the two adjacent rows, e.g. fixation means such as encompassing cast resins or fixation members, preferably of a plastic material.

In another embodiment, a magnetically conducting element comprises at least one lower portion and at least one upper portion. In other words, a vertical position, i.e. a position along the vertical axis, of a lower portion, in particular a centre line, a longitudinal axis or a geometric centre of said lower portion, can be smaller than a vertical position, i.e. a position along the vertical axis, of an upper portion, in particular a centre line, a longitudinal axis or a geometric centre of said upper portion. In other words, a lower portion and an upper portion are arranged at different height levels along the vertical axis.

Further, a recess can be provided or enclosed by the at least one lower portion and the at least one upper portion. Preferably, the recess is provided by or enclosed by two lower and one upper portion.

In particular, a row of multiple subelements can comprise at least one lower magnetically conductive subelement and at least one upper magnetically conducting subelement. One subelement of a set of two successive elements along a row of multiple subelements can be provided by an upper subelement, wherein the further subelement of said set can be provided by a lower subelement.

In this case, a lower portion can be provided by a lower magnetically conductive subelement and an upper portion by an upper magnetically conducting subelement. Preferably, a magnetically conducting element comprises three subelements, wherein two subelements are lower subelements and one element is an upper subelement. Along the row, in particular along the longitudinal axis, a first lower subelement can be followed by the upper subelement, wherein the upper subelement is followed by a second lower subelement.

A lower and an upper subelement can overlap each other. Further, a lower and an upper subelement can be aligned with a lateral offset to one another.

This advantageously allows to adapt a geometry of a magnetically conducting element to a design of the secondary winding structure.

In another embodiment, a magnetically conducting element provides a recess to receive at least a section of the secondary winding structure. In particular, the recess can be arranged and/or designed in order to receive a section of the secondary winding structure extending along or parallel to the lateral axis. More particular, the recess can be designed and/or arranged such that a section of the secondary winding structure at the transition from one subwinding structure to the successive subwinding structure along the longitudinal axis can be arranged within the recess. In the secondary-sided arrangement, at least one section of the secondary winding structure can be arranged within the recess.

As explained before, magnetically conducting subelements of a magnetically conducting element can be arranged in a row. Further, at least two successive magnetically conductive elements can be aligned with a vertical offset to one another. This can mean that a non-zero distance between the longitudinal axes or geometric centres of two successive magnetically conductive subelements is provided along or against the vertical axis. Further, there can be no vertical offset between every second magnetically conductive subelement in a row. By providing the vertical offset, the aforementioned recess can be provided. The recess can be provided if there is a non-zero distance between the two subelements which are provided by the subelements with no vertical offset.

For example, the magnetically conductive subelements of one row can be arranged such that a recess is provided. The recess can be provided if end sections of one magnetically conductive element, in particular an elongated element, overlap end sections of further magnetically conductive elements respectively.

In some non-limiting embodiments, one row comprises lower magnetically conductive subelements and at least one upper magnetically conductive subelement, wherein the lower subelements are arranged such that a non-zero gap, i.e. a non-zero distance, is provided between the lower magnetically conductive elements along or parallel to the longitudinal axis. Further, the upper subelement can be arranged such that the section between the lower subelements is bridged by the upper subelement.

Further, the lower magnetically conductive subelements can be arranged within a volume or area enclosed by (sub)winding structures of the secondary winding structure, wherein an upper magnetically conductive element bridges the section of the winding structure between the volumes of two adjacent subwinding structures. In this case, a first end section of the upper magnetically conductive subelement can overlap an end section of a first lower magnetically conductive subelement, wherein another end section of the upper magnetically conductive subelement overlaps an end section of a second lower magnetically conductive subelement.

In a cross section in a section area which is oriented perpendicular to the lateral axis, this arrangement of magnetically conductive subelements in the row provides a hat-like structure.

The dimension, in particular a length and/or a width and/or a height, can be adapted to the dimension of the section of the secondary winding structure to be received.

For example, a row of multiple magnetically conducting subelements can be designed such that a first subset of subelements is arranged at a first vertical position and a second set of subelements is arranged at a second vertical position, wherein the second vertical position is higher or lower than the first vertical position. Within the arrangement of subelements along the row, an alternating sequence of subelements from the first set and from the second set can be provided. In this configuration, a gap can be provided between two subelements of one of the sets, wherein this gap is covered or bordered by one subelement of the other set. In other words, the arrangement or row of subelements can provide a recess to receive at least one section of the winding structure. In particular, the recess can be arranged and/or designed in order to receive a section of the winding structure extending along or parallel to the lateral axis. In some non-limiting embodiments, the recess can be designed and/or arranged such that a section of the winding structure at the transition from one subwinding structure to the successive subwinding structure along the longitudinal axis can be arranged within the recess. Further, at least one section of the subelement or of the row of subelements can extend into one subwinding structure of the winding structure. This can mean that the at least one section extends into a volume or area enclosed by the subwinding structure.

Providing a recess advantageously reduces an installation space requirement of the proposed arrangement.

In another embodiment, at least one section of at least one magnetically conductive element extends into or through a volume or area enclosed by the secondary winding structure or by a subwinding structure of the secondary winding structure.

For example, at least one section of at least one magnetically conductive element can be arranged within the volume or area enclosed by a (sub)winding structure of the secondary winding structure. A height of a magnetically conductive element which is arranged within the volume enclosed by a subwinding structure can be larger than, equal to or smaller than the height of the subwinding structure. This advantageously further reduces an installation space requirement. Further, the arrangement of a magnetically conductive element within the volume advantageously increases the amount of field lines of the alternating electromagnetic field which extend through said volume as the magnetically conductive element serves as a field collector.

It is possible that 30% to 70%, preferably 45% to 55%, of the volume enclosed by the subwinding structure is filled with one or multiple magnetically conductive elements.

If a magnetically conductive element comprises one or multiple rows of more than one magnetically conductive subelement, the magnetically conductive subelements of one row can be arranged such at least one section of the secondary winding structure is arranged within the recess provided by the row, wherein at least one other section of the row is arranged within the volume or area enclosed by the (sub)winding structure. In particular, a lower magnetically conductive subelement can be arranged within a volume or area enclosed by a (sub)winding structure of the secondary winding structure, wherein an upper magnetically conductive element bridges the section between the lower magnetically conductive elements as outlined before. For example, one row comprises lower magnetically conductive subelements and at least one or multiple upper magnetically conductive subelement/s, wherein the lower magnetically conductive subelements are each arranged within a volume or area enclosed by a subwinding structure, wherein an upper magnetically conductive subelement bridges the section of the winding structure between the volumes of two adjacent subwinding structures. In this case, a first end section of the upper magnetically conductive subelement can overlap an end section of a first lower magnetically conductive subelement, wherein another end section of the upper magnetically conductive subelement overlaps an end section of a second lower magnetically conductive subelement. The recess is provided between the lower magnetically conductive elements. In a cross section, this arrangement of magnetically conductive elements in the row provides a hat-like structure.

In another embodiment, a non-zero gap is provided between two adjacent magnetically conducting elements along the lateral direction. This has been explained before. This advantageously allows to manufacture the arrangement of magnetically conducting elements.

In another embodiment, a width of a lateral outer magnetically conducting element broadens in at least one section along the length of the lateral outer magnetically conducting element. It is further possible that a width of a lateral outer magnetically conducting element rejuvenates in at least one further section along the length of the lateral outer magnetically conducting element.

In particular, a lateral outer magnetically conducting element can have at least two sections, wherein the width of a first section is smaller than a width of a second section of the lateral outer magnetically conducting element.

Further, the lateral outer magnetically conducting element can have a third section, wherein the width of the third section is smaller than the width of the second section, in particular equal to the width of the first section, wherein the first, the second and, if applicable, the third section are successive sections along the longitudinal axis. Alternatively, the width of the third section can be higher than the width of the second section. In this case, the lateral outer magnetically conducting element can have a fourth section, wherein the width of the fourth section is smaller than the width of the third section, in particular equal to the width of the second section. Further, the lateral outer magnetically conducting element can have a fifth section, wherein the width of the fifth section is smaller than the width of the fourth section, in particular equal to the width of the first section.

More generally, it is possible that the lateral outer magnetically conducting element has multiple sections with different widths, wherein the sections are successive sections along the longitudinal axis.

A width in a section can be constant along the length of the section. A length of one section can be a non-zero length, e.g. a length larger than 1 mm.

If the lateral outer magnetically conducting element comprises multiple subelements which are arranged in a row, a section can be provided by one subelement or by a portion thereof. Consequently, the width of a section can be the width of the subelement or of a portion of the subelement.

It is possible, that a portion of the first subelement provides the first section, wherein a remaining portion of the first subelement, a second subelement and a portion of a third subelement provide the second section. A remaining portion of the third subelement can provide the third section. Moreover, it is possible, that a portion of the first subelement provides the first section, wherein a remaining portion of the first subelement provides a second section. A second subelement provides a third section. A portion of a third subelement provides the fourth section. A remaining portion of the third subelement can provide the fifth section. The first and the third subelement can be lower subelements, wherein the second subelement can be an upper subelement.

It is further possible that a width of an inner magnetically conducting element is constant along the length of the inner magnetically conducting element. Alternatively, a width of an inner magnetically conducting element can vary, e.g. increase and/or decrease, along the length of the inner magnetically conducting element. The width of an inner magnetically conducting element can vary in the same way as a lateral outer magnetically conducting element.

Providing a lateral outer magnetically conducting element with a varying width advantageously allows to provide space for arranging other components between the two adjacent magnetically conducting elements, e.g. fixation means.

In another embodiment, a lateral outer magnetically conducting element has or provides a lateral protruding section. A lateral protruding section can protrude outwards, e.g. away from an inner magnetically conducting element along the lateral axis.

The lateral protruding section can be provided by a subelement of a magnetically conducting element, in particular by an upper subelement, or a portion thereof.

The lateral protruding section can extend above the secondary winding structure, in particular above a winding head or at least a portion thereof.

In particular, the protruding section can be provided by a section with a width which is higher than the width of at least one other section of the magnetically conducting element or which is higher than the width of all other sections of the magnetically conducting element. In particular, the protruding section can be provided by the aforementioned second or third section of the lateral outer magnetically conducting element.

In another embodiment, the arrangement comprises at least one antenna element, wherein at least one portion of at least one magnetic conducting element is a part of the antenna element. The antenna element can be part of a communication unit or positioning system of the power transfer unit. The communication unit can be a transmitter unit or a receiver unit, in particular for a unidirectional communication. The at least one antenna element is designed separate from the winding structure. This means that the antenna element is not provided by the winding structure. Further, the antenna element can be a receiving antenna element or a transmitting antenna element for a communication signal. The communication signal can in particular be a low-frequency signal. This can mean that the antenna element is designed such that a signal with a frequency from the range of 100 kHz to 400 kHz can be transmitted or received by said antenna element. In other words, at least a part of the antenna element can be integrated into or onto the at least one flux guiding means. In particular, the antenna element can be a so-called ferrite rod antenna, wherein an antenna winding structure is arranged on a ferrite element. In this case, the ferrite element of the ferrite rod antenna corresponds to or is equal to at least a part of the at least one flux guiding means. Generally, the antenna element can be a so-called magnetic rod antenna, wherein an antenna winding structure is arranged on a rod of magnetic material. This magnetic material can be part of the at least one flux guiding means.

Further, the antenna element can be wound around at least one section of a magnetically conducting element, in particular an inner magnetically conducting element. Further, the antenna element can be wound around at least one section of multiple flux guiding means. Further, at least one part of the antenna element can be arranged within an area enclosed by the winding structure in a common plane of projection and/or at least one part of the antenna element can be arranged outside an area enclosed by the winding structure in a common plane of projection.

Further described is a method of communication between a primary unit and a secondary unit of a system for inductive power transfer, wherein the secondary unit comprises a secondary-sided arrangement of winding structures according to one of the embodiments disclosed in present disclosure, wherein the secondary unit transmits a signal to the primary unit by the at least one antenna element and/or wherein the secondary unit receives a signal of the primary unit by the at least one antenna element.

Further described is a system for inductive power transfer, wherein the system comprises a primary-sided arrangement of primary winding structures. Such a primary sided-arrangement can comprise at least three phase lines and at least one winding structure per phase line, wherein each winding structure comprises at least one subwinding structure, wherein the winding structures extend along a longitudinal axis of the primary-sided arrangement.

Further, a pitch between corresponding subwinding structures of the winding structures varies along the longitudinal axis and/or a length of the subwinding structures of the winding structures varies along the longitudinal axis.

Further, a pitch between corresponding subwinding structures of a first winding structure and a second winding structure can be chosen from an interval of [0,1] of a length of one subwinding structure.

Further, a pitch between corresponding subwinding structures of the first winding structure and the third winding structure can be smaller than the pitch between corresponding subwinding structures of the first winding structure and the second winding structure.

A primary-sided arrangement is e.g. described in PCT/EP2016/064556 and PCT/EP2016/064557 which are both fully incorporated by reference. In particular the primary-sided arrangement can be designed according to one of the claims 1 to 18 disclosed in PCT/EP2016/064556 or according to one of the claims 1 to 5 disclosed in PCT/EP2016/064557.

Further, the system comprises a secondary-sided arrangement according to one of the embodiments disclosed in this disclosure.

Further proposed is a method of manufacturing a secondary-sided arrangement of at least one secondary winding structure which comprises the steps of
- providing at least one phase line and one secondary winding structure per phase line
- providing at least two magnetically conducting elements,
- providing one of the magnetically conducting elements as a lateral outer magnetically conducting element by arranging the magnetically conducting element such that it is arranged at a lateral side of the set of all magnetically conducting elements,
- providing one of the magnetically conducting elements as an inner magnetically conducting element by arranging the magnetically conducting element such that it is not arranged at a lateral side of the set of all magnetically conducting elements,
- providing the lateral outer magnetically conducting element and the inner magnetically conducting element such that a width of the at least one lateral outer magnetically conducting element is larger than a width of the at least one inner magnetically conducting element and/or a length of the at least one inner magnetically conducting element is smaller than a length of the at least one lateral outer magnetically conducting element.

The method advantageously allows to provide a secondary-sided arrangement according to one of the embodiments described in the present disclosure. Thus, the method can comprise all steps in order to provide such a secondary-sided arrangement.

BRIEF DESCRIPTION OF THE DRAWINGS

The present disclosure will be described with reference to exemplary embodiments of the present disclosure which are illustrated by the following figures. The figures show.

DESCRIPTION OF THE INVENTIONS

In the following, the same numerals denote elements with the same or similar technical features.

Figure 1:
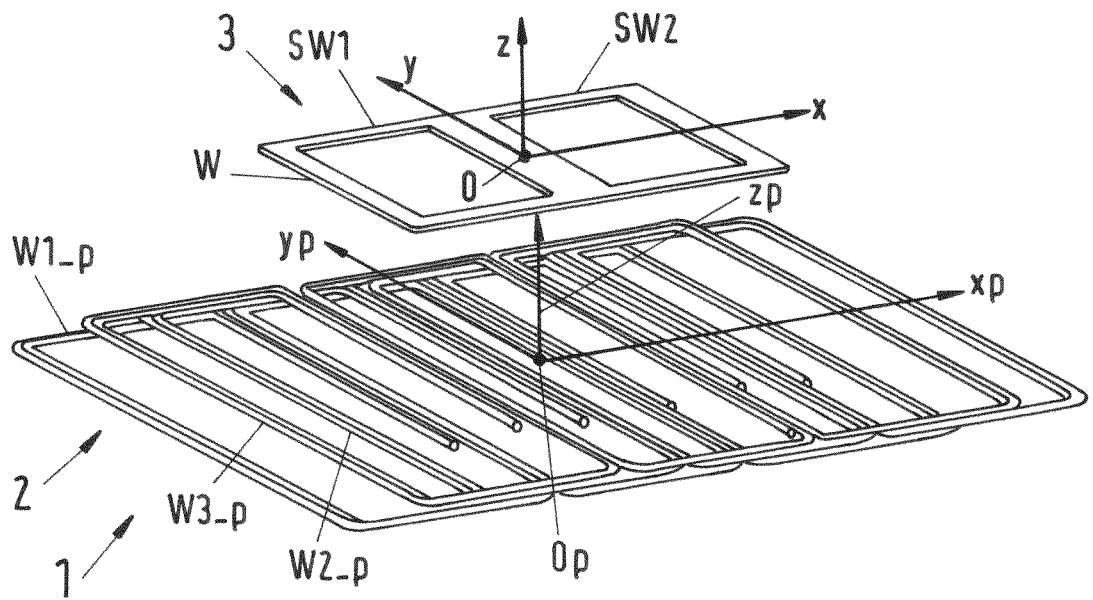
FIG. 1: a schematic perspective view on a primary-sided arrangement and a secondary-sided arrangement of winding structures.

FIG. 1 shows a perspective view on a system 1 for inductive power transfer 2, wherein the system comprises a primary-sided arrangement 2 with primary winding structures W1_p, W2_p, W3_p. Such a primary-sided arrangement 2 comprises a first winding structure W1_p which have three subwinding structures, a second winding structure W2_p with three subwinding structures and a third winding structure W3_p with three subwinding structures, respectively. These winding structures W1_p, W2_p, W3_p provide each a phase line of a three phase topology. In the example shown in FIG. 1, the subwinding structures have the shape of a rectangular loop.

Further shown is a primary-sided coordinate system with a primary-sided longitudinal axis xp and a primary-sided lateral axis yp. Directions of these axes xp, yp are indicated by arrows. These axes xp, yp span a plane, wherein the winding structures W1_p, W2_p, W3_p are substantially arranged in planes parallel to said plane. A primary-sided vertical axis zp is oriented perpendicular to said plane. A direction of the vertical axis zp is indicated by an arrow and oriented from the primary-sided arrangement 2 to the secondary-sided arrangement 3. It is possible that the winding structures W1_p, W2_p, W3_p are arranged in different planes in order to overlap each other. Further shown is an origin Op of the primary-sided coordinate system which is provided by a geometric centre of the primary-sided arrangement 2.

The winding structures W1_p, W2_p, W3_p extend along the longitudinal axis x. It is shown that each winding structure W1_p, W2_p, W3_p comprises three subwinding structures, wherein the subwinding structures of each winding structure W1_p, W2_p, W3_p extend along the longitudinal axis xp. Subwinding structures of one winding structure are arranged adjacent to each other along the longitudinal axis xp and do not overlap.

The system further comprises a secondary-sided arrangement 3 of one secondary-sided winding structure W. The secondary winding structure W comprises two adjacent subwinding structures SW1, SW2 which are arranged adjacent to each other along a secondary-sided longitudinal axis x. The subwindings SW1, SW2 of the secondary winding structure W2 are shaped as rectangular loops.

Further, the secondary winding structure W is substantially arranged in a plane spanned by the secondary-sided longitudinal axis x and a secondary-sided lateral axis y which is oriented perpendicular to the secondary-sided longitudinal axis x. Both secondary-sided axes x, y are oriented perpendicular to a secondary-sided vertical axis z. Directions of these axes x, y, z are indicated by arrows. The secondary-sided vertical axis z is oriented in a direction pointing away from the primary-sided arrangement 2.

Further shown is an origin O of the secondary-sided coordinate system which is provided by a geometric centre of the secondary-sided arrangement 3.

The secondary-sided arrangement 3 can be part of a receiving unit attached to a vehicle, in particular an automobile. In this case, the secondary-sided longitudinal axis x can be oriented parallel to a roll axis of the vehicle, the secondary-sided lateral axis y can be oriented parallel to a pitch axis of the vehicle and the secondary-sided vertical axis z can be oriented parallel to a yaw axis of the vehicle.

In an aligned state of the primary-sided arrangement 2 and of the secondary-sided arrangement 3, corresponding axes xp, x; yp, y; zp, z can be oriented parallel to each other.

Further, a geometric centre 0 of the secondary winding structure 2 can be arranged above an active area enclosed by the winding structures W1_p, W2_p, W3_p of the primary-sided arrangement 1 or a predetermined subarea of said active area or a predetermined area comprising said active area.

Figure 2:
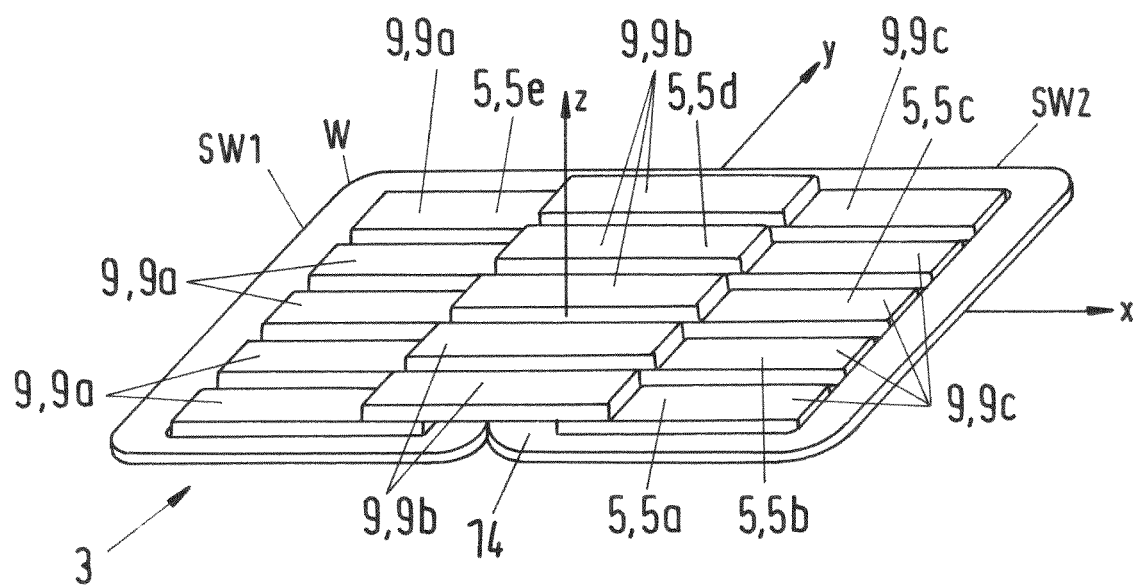
FIG. 2: a schematic perspective view on a secondary-sided arrangement of a winding structure according to the state of the art.

FIG. 2 shows a schematic perspective view on a secondary-sided arrangement 3 of the state of the art with a secondary winding structure W. The secondary winding structure can be designed as the secondary winding structure W shown in FIG. 1. The secondary-sided arrangement 3 also comprises multiple, in particular five, rows 5 of ferrite bars 9 which are arranged adjacent to one another along a lateral axis y.

Each row 5 provides a magnetically conductive element, wherein a ferrite bar 9 of one row 5 provides a magnetically conductive subelement of said row 5, i.e. of said magnetically conductive element. One row 5 of ferrite elements comprises multiple ferrite bars 9, in particular three ferrite bars 9.

The rows 5 are spaced apart from one another with a non-zero distance along the lateral axis y. Each row 5 has the same length along the longitudinal axis. Further, a width of said rows 5 is constant along the length for each row 5, wherein the width of all rows 5 are equal.

FIG. 2 shows that each row 5 and thus a magnetically conductive element provides a recess 14 to receive a section of the secondary-sided winding structure W2. In particular, adjacent sections of the subwinding structures SW1, SW2 which extend along the secondary-sided lateral axis y are arranged within the recesses 14. A rear end section of each row 5, in particular a first ferrite bar 9a of said row 5, extends into an inner volume of the first subwinding structure SW1, wherein the inner volume denotes the volume enclosed by the rectangular loop providing the first subwinding structure SW1. A front end section of each row 5, in particular a third ferrite bar 9c of said row 5, extends into the inner volume of the second subwinding structure SW2. Rear and front end sections of a centre section of each row 5, in particular of a second ferrite bar 9b of said row 5, overlap the first and the third ferrite bar 9a, 9c, respectively, such that the recess 14 is provided between the first and the third ferrite bar 9a, 9c of the row 5 and covered or bridged by the second ferrite bar 9b of the row 5.

The first and the third ferrite bar 9a, 9c can also be referred to as lower ferrite bars, wherein the second ferrite bar 9b can be referred to as upper ferrite bar 9b. With respect to the vertical direction z, the second ferrite bar 9b of a row 5 is arranged above the adjacent sections of the subwinding structures SW1, SW2 which are arranged in the recess 14. Further, the second ferrite bar 9b of a row 5 is arranged above the first and the third ferrite bar 9a, 9c of said row 5. In other words, the first and the second ferrite bar 9a, 9b in each row are aligned with a non-zero vertical offset along the z-direction to one another. In the free space provide by the non-zero vertical offset between the first and the second ferrite bar 9a, 9b, an adhesive member and a casting material can be arranged in order to keep the ferrite bars 9a, 9b in alignment to one another and to facilitate the installation of the ferrite bars 9a, 9b. The first and the third ferrite bar 9a, 9c in each row are aligned with no vertical offset to one another and are both arranged in the same plane as the winding structures W1, W2.

Further, a first row 5a provides a first lateral outer magnetically conducting element. A fifth row 5 provides a second lateral outer magnetically conducting element with respect to the lateral axis y. A second, a third and a fourth row 5b, 5c, 5d each provide inner magnetically conducting elements with respect to the lateral axis y. The first row 5a and the fifth row 5e are rows 5 arranged at opposite lateral sides or edges of the set of all rows 5. The second, the third and the fourth row 2, 3, 4 are rows which do not provide a row 5 at a lateral side or edge of the set of all rows 5. In particular, the third and the fourth row 2, 3, 4 are arranged in between the first and the second lateral outer rows 5a, 5e along the lateral axis y.

Figure 3:
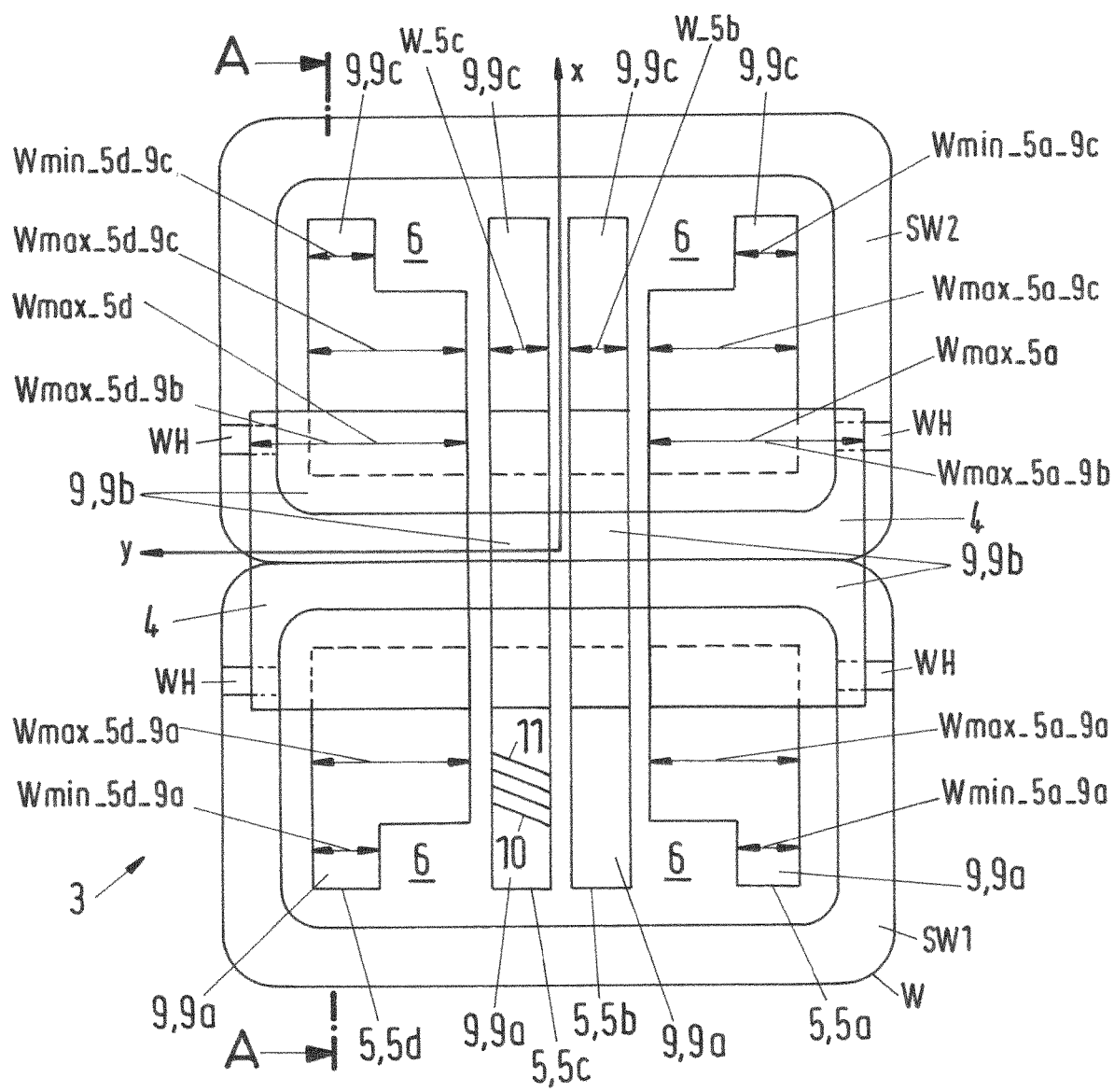
FIG. 3: a top view on a secondary-sided arrangement of a winding structure according to the present disclosure.

FIG. 3 shows a schematic top view on a secondary-sided arrangement 3 of a secondary winding structure W with two subwinding structures SW1, SW2 which are arranged adjacent to each other along a longitudinal axis x. The embodiment shown in FIG. 3 is similar to the embodiment shown in FIG. 2.

In contrast to the embodiment shown in FIG. 2 a first and a fourth row 5a, 5d provide a first and a second lateral outer magnetically conducting element and are arranged at opposite lateral sides or edges of the set of all rows 5. A second and a third row 2, 3 are provide inner magnetically conducting elements and are arranged in between the first and the second lateral outer rows 5a, 5d along the lateral axis y.

Further, a maximal width $Wmax\_5a$ of the first row 5a and a maximal width $Wmax\_5d$ of the fourth row 5d are each larger than a maximal width of the set of widths $W\_5b$, $W\_5c$ of the second and third row 5b, 5c.

A maximal width $W\_5b$, $W\_5c$ of the second and third row 5b, 5c can be equal. Also, a maximal width $Wmax\_5a$, $Wmax\_5d$ of the first and the fourth row 5a, 5d can be equal.

It is further shown that a maximal width $Wmax\_5d\_9a$ of the first ferrite bar 9a of the first row 5a is larger than a width of the first ferrite bar 9a of the second and the third row 5b, 5c, respectively, which is equal to the width $W\_5b$, $W\_5c$ of said rows 5b, 5c. The width of the second and the third row 5b, 5c is constant along the length.

Also, a maximal width $Wmax\_5a\_9b$ of the second ferrite bar 9b of the first row 5a is larger than a width of the second ferrite bar 9b of the second and the third row 5b, 5c, respectively, which is also equal to the width $W\_5b$, $W\_5c$ of said rows 5b, 5c. Further, the maximal width $Wmax\_5a\_9b$ of the second ferrite bar 9b of the first row 5a is larger than the maximal width $Wmax\_5a\_9a$ of the first ferrite bar 9a of the first row 5a. This, however, is a preferred but not a mandatory feature. It is also possible that the maximal width $Wmax\_5a\_9b$ of the second ferrite bar 9b of the first row 5a is equal to the maximal width $Wmax\_5a\_9a$ of the first ferrite bar 9a of the first row 5a. Further, a maximal width $Wmax\_5a\_9c$ of the third ferrite bar 9c of the first row 5a is larger than a width of the third ferrite bar 9c of the second and the third row 5b, 5c, respectively, which is also equal to the width $W\_5b$, $W\_5c$ of said rows 5b, 5c. Further, the maximal width $Wmax\_5a\_9c$ of the third ferrite bar 9c of the first row 5a is smaller than the maximal width $Wmax\_5a\_9b$ of the second ferrite bar 9b of the first row 5a. This, however, is a preferred but not a mandatory feature. It is also possible that the maximal width $Wmax\_5a\_9c$ of the third ferrite bar 9c of the first row 5a is equal to the maximal width $Wmax\_5a\_9b$ of the second ferrite bar 9b of the first row 5a. In particular, the maximal width $Wmax\_5a\_9c$ of the third ferrite bar 9c of the first row 5a is equal to the maximal width $Wmax\_5a\_9a$ of the first ferrite bar 9a of the first row 5a.

In the embodiment shown in FIG. 3, a width of the first and the fourth row 5a, 5d varies along the length of said rows 5a, 5d. In particular, the width broadens in at least one section along the length and rejuvenates in a further section.

It is shown that a first section of the first ferrite bar 9a of the first row 5a has a minimal width $Wmin\_5a\_9a$, wherein a second section of the first ferrite bar 9a of the first row 5a has a larger width which corresponds to the maximal width Wmax_5a_9a of the first ferrite bar 9a. The second section of the first ferrite bar 9a succeeds the first section of the first ferrite bar 9a along the longitudinal axis x. Thus, a width of the first ferrite bar 9a varies along its length. Along the longitudinal axis, the width of the first ferrite bar 9a increases.

It is further shown that a second section of the third ferrite bar 9c of the first row 5a has a minimal width Wmin_5a_9c, wherein a first section of the third ferrite bar 9c of the first row 5a has a larger width which corresponds to the maximal width Wmax_5a_9c of the third ferrite bar 9c. The second section of the third ferrite bar 9c succeeds the first section of the first ferrite bar 9c along the longitudinal axis x. Thus, a width of the third ferrite bar 9c varies along its length. Along the longitudinal axis, the width of the third ferrite bar 9c decreases.

It is shown that the increase and the decrease of the width along the longitudinal axis x is a stepwise increase or decrease. Other courses of the change of width are, however, implementable, e.g. a linear increase or decrease or a curved increase or decrease.

Because of the increasing or decreasing width of the first row 5, an interspace between the first row 5a and the second row 5b also decreases or increases. An increasing interspace can be used to arrange further components of the secondary-sided arrangement, e.g. fastening means such as screws, between the first row 5a and the second row 5b. In particular, such an installation space 6 is provided between the first section of the first ferrite bar 9a of the first row 5a and the first ferrite bar 9a of the second row 5b and between the second section of the third ferrite bar 9c of the first row 5a and the third ferrite bar 9c of the second row 5b.

The first row 5a provides or has a protruding section 4, wherein the protruding section 4 overtops a subsection of the winding structure W, in particular at least a part of windings heads WH of the winding structure W. This means that, in a common plane of projection which is oriented perpendicular to the vertical axis z (see FIG. 2), the protruding section 4 overlaps with at least one winding head WH and/or with the winding structure W, in particular at least one subwinding SW1, SW2 of the winding structure W. The protruding section 4 can be provided at a lateral outer edge or side of the first row 5a.

The protruding section can be provided by the second ferrite bar 9b of the first row 5a.

The design of the fourth row 5d is provided by mirroring the first row 5a by a mirror plane which is spanned by the longitudinal axis x and the vertical axis z. Thus, corresponding width-related features apply to the design of the fourth row 5d and the ferrite bars 9a, 9b, 9c of said fourth row 5d.

Further shown is an antenna element 10, wherein a winding structure 11 of the antenna element 10 is wound around one section of one of the ferrite bars 9, in particular around a first ferrite bar 9a of the second row 5b. Alternatively, it is also possible to provide the antenna element 10 by a winding structure which is wound around another ferrite bar 9b, 9c of the second row 5b or around another ferrite bar 9a, 9b, 9c of another row 5a, 5c, 5d.

Figure 4:
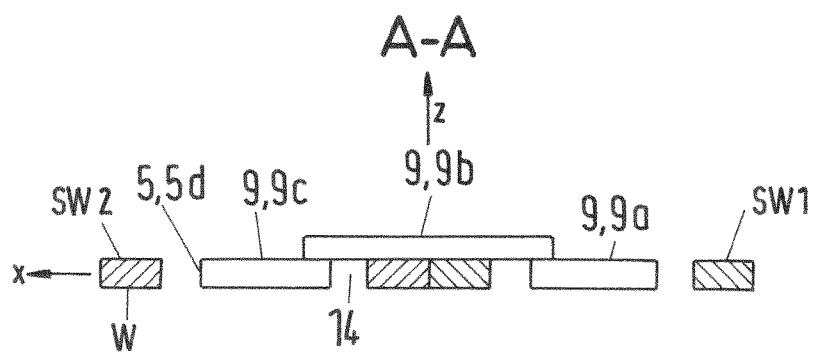
FIG. 4: a schematic cross section of a secondary-sided arrangement of winding structures.

FIG. 4 shows a schematic cross section of a secondary-sided arrangement along a section line A-A of the winding structure W shown in FIG. 3. It is shown that a rear end section of the second ferrite bar 9b of the fourth row 5d overlaps a front end section of the first ferrite bar 9a of the fourth row 5d. Further, a front end section of the second ferrite bar 9b overlaps the rear end section of a third ferrite bar 9c.

It is further shown that the ferrite bars 9a, 9b, 9c have a constant height along their respective longitudinal axis. It is possible that a height of the first and the third ferrite bar 9a, 9c are equal. A height of the second ferrite bar 9b can also be equal to the height of the first and the third ferrite bar 9a, 9c. Alternatively, a height of the second ferrite bar 9b can be larger than the height of the first and the third ferrite bar 9a, 9c.

Two successive ferrite bars 9a, 9b, 9c along the longitudinal axis x are aligned with a vertical offset to one another. The first and the third ferrite bar 9a, 9c are arranged at the same height.

Further, a non-zero gap is provided between the first and the third ferrite bar 9a, 9c along the longitudinal axis x. The vertical offset between the first and the second ferrite bar 9a, 9b as well as the vertical offset between the second and the third ferrite bar 9b, 9c and the non-zero gap are chosen such that a recess 14 is provided between the first, the second and the third ferrite bar 9a, 9b, 9c to receive a section of the winding structure W.

The ferrite bars 9a, 9b, 9c are arranged in a row 5. The first and the third ferrite bar 9a, 9c can also be referred to as lower ferrite bars, wherein the second ferrite bar can be referred to as upper ferrite bar 9b. It is shown that end sections of successive ferrite bars 9a, 9b, 9c mechanically contact each other. In particular, a bottom side of the second ferrite bar 9b at the front end section of the second ferrite bar 9b touches an upper side of the third ferrite bar 9c at the rear end section of the third ferrite bar 9c. Further, a bottom side of the second ferrite bar 9b at the rear end section of the second ferrite bar 9b touches an upper side of the first ferrite bar 9a at the front end section of the first ferrite bar 9a.

Figure 5:
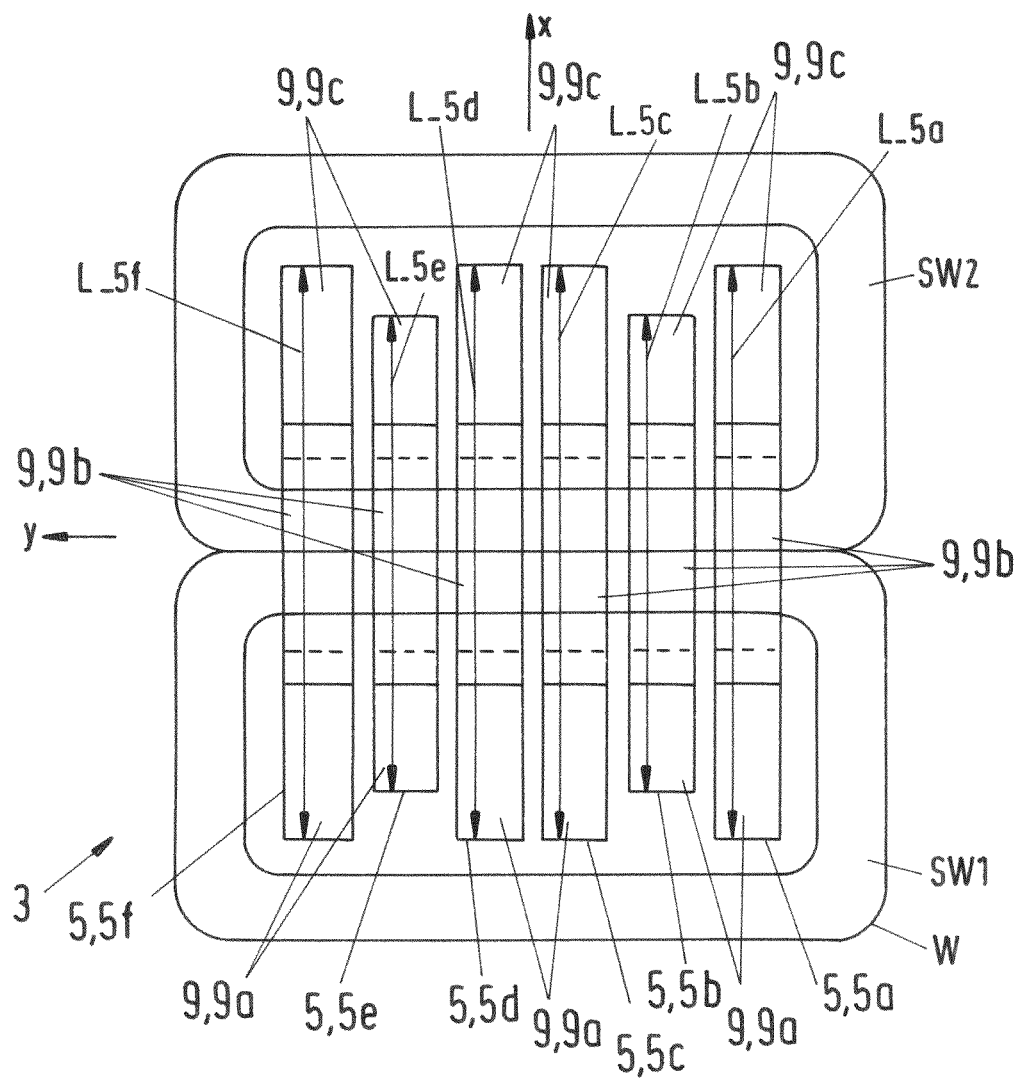
FIG. 5: a top view on a secondary-sided arrangement of a winding structure according to another embodiment of the present disclosure.

FIG. 5 shows a top view on a secondary-sided arrangement 3 of a winding structure according to another embodiment of the present disclosure. The arrangement 3 comprises six rows 5a, 5b, 5c, 5d, 5e, 5f of three ferrite bars 9a, 9b, 9c, wherein one row 5a, 5b, 5c, 5d, 5e, 5f is designed as a row 5 shown in FIG. 2. In particular, the rows 5a, . . . , 5f are arranged adjacent to one another along the lateral axis y with a non-zero gap provided between two adjacent rows 5a, . . . , 5f.

In the embodiment shown in FIG. 5, the first row 5 provides a first lateral outer magnetically conducting element and the sixth row 5f a second lateral outer magnetically conducting element. The second, third, fourth and fifth row 5b, 5c, 5d, 5e each provide inner magnetically conducting elements.

In contrast to the embodiment shown in FIG. 2, it is shown that the second and the fifth row 5b, 5e have a length L_5b, L_5e which is smaller than a length L_5a of the first row 5a and a length L_5f of the sixth row 5f, respectively. Additionally, the length L_5b, L_5e of the second and the fifth row 5b, 5e is smaller than a length L_5c of the third row 5c and a length L_5d of the fourth row 5d, respectively. The length L_5a, L_5c, L_5d, L_5f of the first, the third, the fourth and the sixth row 5a, 5c, 5d, 5f can be equal.

The invention claimed is:

1. A secondary-sided arrangement of at least one secondary winding structure, wherein the secondary-sided arrangement comprises:
    at least one phase line and one secondary winding structure per phase line, wherein the secondary-sided arrangement comprises at least two magnetically conducting elements;
    at least one lateral outer magnetically conducting element and at least one inner magnetically conducting element;

wherein at least one secondary winding structure extends along a longitudinal axis of the secondary-sided arrangement;
wherein the at least one secondary winding structure comprises two or more subwinding structures which extend along the longitudinal axis;
wherein successive subwinding structures of the at least one secondary winding structure are arranged adjacent to one another along the longitudinal axis;
wherein at least one subwinding structure comprises at least one winding section which extends along the longitudinal axis and at least one winding section which extends along a lateral axis;
wherein the lateral axis is oriented perpendicular to the longitudinal axis;
wherein a length is measured along the longitudinal axis and a width is measured along the lateral axis; and
wherein
a length of the at least one inner magnetically conducting element is smaller than a length of the at least one lateral outer magnetically conducting element, wherein the at least one secondary winding structure is substantially arranged within a two-dimensional plane spanned by the longitudinal and lateral axes, wherein at least one section of at least one magnetically conductive element extends into or through a volume or area enclosed by the at least one secondary winding structure or by a subwinding structure of the at least one secondary winding structure.

2. The secondary-sided arrangement of claim 1, wherein one magnetically conducting element of the at least two magnetically conducting elements is provided by a bar element or that a magnetically conducting element comprises multiple subelements, wherein one subelement is provided by a bar element.

3. The secondary-sided arrangement of claim 1, wherein one magnetically conducting element of the at least two magnetically conducting elements comprises at least one row of at least two magnetically conductive subelements.

4. The secondary-sided arrangement of claim 3, wherein the at least two magnetically conductive subelements of the at least one row overlap each other at least partially.

5. The secondary-sided arrangement of claim 3, wherein the at least two magnetically conductive subelements of the at least one row are aligned with a lateral offset to one another.

6. The secondary-sided arrangement of claim 1, wherein one magnetically conducting element of the at least two magnetically conducting elements comprises at least one lower portion and at least one upper portion.

7. The secondary-sided arrangement of claim 1, wherein one magnetically conducting element of the at least two magnetically conducting elements provides a recess to receive at least a section of the at least one secondary winding structure.

8. The secondary-sided arrangement of claim 1, wherein a gap is provided between two adjacent magnetically conducting elements of the at least two magnetically conducting elements along a lateral direction.

9. The secondary-sided arrangement of claim 1, wherein a width of the at least one lateral outer magnetically conducting element broadens in at least one section along the length of the at least one lateral outer magnetically conducting element.

10. The secondary-sided arrangement of claim 1, wherein the at least one lateral outer magnetically conducting element has or provides a lateral protruding section.

11. The secondary-sided arrangement of claim 1, further comprising:
at least one antenna element,
wherein at least one portion of at least one magnetically conducting element of the at least two magnetically conducting elements is a part of the at least one antenna element.

12. The secondary-sided arrangement of claim 1, wherein one magnetically conducting element of the at least two magnetically conducting elements comprises at least one row of at least two magnetically conductive subelements;
wherein the at least one row comprises:
lower magnetically conductive subelements and at least one upper magnetically conductive subelement,
wherein the lower magnetically conductive subelements are arranged within a volume or area enclosed by the subwinding structures of the at least one secondary winding structure, and
wherein the at least one upper magnetically conductive element bridges the section of the winding structure between volumes of two adjacent subwinding structures, wherein adjacent sections of the subwinding structures which extend along the lateral axis are arranged within a recess provided by the lower magnetically conductive elements and the at least one upper magnetically conductive element.

13. A method of manufacturing a secondary-sided arrangement of at least one secondary winding structure, wherein the method comprises:
providing at least one phase line and one secondary winding structure per phase line, wherein at least one secondary winding structure extends along a longitudinal axis of the secondary-sided arrangement, wherein the at least one secondary winding structure comprises two or more subwinding structures which extend along the longitudinal axis, wherein successive subwinding structures of the at least one secondary winding structure are arranged adjacent to one another along the longitudinal axis, wherein at least one subwinding structure comprises at least one winding section which extends along the longitudinal axis and at least one winding section which extends along a lateral axis, wherein the lateral axis is oriented perpendicular to the longitudinal axis; and wherein a length is measured along the longitudinal axis and a width is measured along the lateral axis;
providing at least two magnetically conducting elements;
providing one of the at least two magnetically conducting elements as a lateral outer magnetically conducting element by arranging one of the at least two magnetically conducting element such that it is arranged at a lateral side of a set of all magnetically conducting elements;
providing one of the at least two magnetically conducting elements as an inner magnetically conducting element by arranging one of the at least two magnetically conducting element such that it is not arranged at a lateral side of the set of all magnetically conducting elements; and
providing the lateral outer magnetically conducting element and the inner magnetically conducting element such that
a length of the inner magnetically conducting element is smaller than a length of the lateral outer magnetically conducting element, wherein the at least one secondary winding structure is substantially arranged within a two-dimensional plane spanned by the longitudinal and lateral axes, wherein at least one section of at least one magnetically conductive element extends into or through a volume or area enclosed by the at least one secondary winding structure or by a subwinding structure of the at least one secondary winding structure.

14. The method of claim 13, wherein one magnetically conducting element of the at least two magnetically conducting elements comprises at least one row of at least two magnetically conductive subelements;
   wherein the at least one row comprises:
      lower magnetically conductive subelements and at least one upper magnetically conductive subelement,
      wherein the lower magnetically conductive subelements are arranged within a volume or area enclosed by the subwinding structures of the at least one secondary winding structure, and
      wherein the at least one upper magnetically conductive element bridges the section of the winding structure between volumes of two adjacent subwinding structures, wherein adjacent sections of the subwinding structures which extend along the lateral axis are arranged within a recess provided by the lower magnetically conductive elements and the at least one upper magnetically conductive element.

15. The secondary-sided arrangement of claim 14, wherein a length of the at least one inner magnetically conducting element is smaller than a length of the at least one lateral outer magnetically conducting element, wherein the at least one secondary winding structure is substantially arranged within a two-dimensional plane spanned by the longitudinal and lateral axes, wherein at least one section of at least one magnetically conductive element extends into or through a volume or area enclosed by the at least one secondary winding structure or by a subwinding structure of the at least one secondary winding structure;
   wherein one magnetically conducting element of the at least two magnetically conducting elements comprises at least one row of at least two magnetically conductive subelements;
   wherein the at least one row comprises:
      lower magnetically conductive subelements and at least one upper magnetically conductive subelement,
      wherein the lower magnetically conductive subelements are arranged within a volume or area enclosed by the subwinding structures of the at least one secondary winding structure, and
      wherein the at least one upper magnetically conductive element bridges the section of the winding structure between volumes of two adjacent subwinding structures, wherein adjacent sections of the subwinding structures which extend along the lateral axis are arranged within a recess provided by the lower magnetically conductive elements and the at least one upper magnetically conductive element.

16. A secondary-sided arrangement of at least one secondary winding structure, wherein the secondary-sided arrangement comprises:
   at least one phase line and one secondary winding structure per phase line, wherein the secondary-sided arrangement comprises at least two magnetically conducting elements;
   at least one lateral outer magnetically conducting element and at least one inner magnetically conducting element;
   wherein at least one secondary winding structure extends along a longitudinal axis of the secondary-sided arrangement;
   wherein the at least one secondary winding structure comprises two or more subwinding structures which extend along the longitudinal axis;
   wherein successive subwinding structures of the at least one secondary winding structure are arranged adjacent to one another along the longitudinal axis;
   wherein at least one subwinding structure comprises at least one winding section which extends along the longitudinal axis and at least one winding section which extends along a lateral axis;
   wherein the lateral axis is oriented perpendicular to the longitudinal axis;
   wherein a length is measured along the longitudinal axis and a width is measured along the lateral axis; and
   wherein a width of the at least one lateral outer magnetically conducting element is larger than a width of the at least one inner magnetically conducting element.

17. A method of manufacturing a secondary-sided arrangement of at least one secondary winding structure, wherein the method comprises:
   providing at least one phase line and one secondary winding structure per phase line, wherein at least one secondary winding structure extends along a longitudinal axis of the secondary-sided arrangement, wherein the at least one secondary winding structure comprises two or more subwinding structures which extend along the longitudinal axis, wherein successive subwinding structures of the at least one secondary winding structure are arranged adjacent to one another along the longitudinal axis, wherein at least one subwinding structure comprises at least one winding section which extends along the longitudinal axis and at least one winding section which extends along a lateral axis, wherein the lateral axis is oriented perpendicular to the longitudinal axis; and wherein a length is measured along the longitudinal axis and a width is measured along the lateral axis;
   providing at least two magnetically conducting elements;
   providing one of the at least two magnetically conducting elements as a lateral outer magnetically conducting element by arranging one of the at least two magnetically conducting element such that it is arranged at a lateral side of a set of all magnetically conducting elements;
   providing one of the at least two magnetically conducting elements as an inner magnetically conducting element by arranging one of the at least two magnetically conducting element such that it is not arranged at a lateral side of the set of all magnetically conducting elements; and
   providing the lateral outer magnetically conducting element and the inner magnetically conducting element such that a width of the lateral outer magnetically conducting element is larger than a width of the inner magnetically conducting element.

18. The method of claim 17, wherein a length of the at least one inner magnetically conducting element is smaller than a length of the at least one lateral outer magnetically conducting element, wherein the at least one secondary winding structure is substantially arranged within a two-dimensional plane spanned by the longitudinal and lateral axes, wherein at least one section of at least one magnetically conductive element extends into or through a volume or area enclosed by the at least one secondary winding structure or by a subwinding structure of the at least one secondary winding structure;

wherein one magnetically conducting element of the at least two magnetically conducting elements comprises at least one row of at least two magnetically conductive subelements;

wherein the at least one row comprises:
- lower magnetically conductive subelements and at least one upper magnetically conductive subelement,
- wherein the lower magnetically conductive subelements are arranged within a volume or area enclosed by the subwinding structures of the at least one secondary winding structure, and
- wherein the at least one upper magnetically conductive element bridges the section of the winding structure between volumes of two adjacent subwinding structures, wherein adjacent sections of the subwinding structures which extend along the lateral axis are arranged within a recess provided by the lower magnetically conductive elements and the at least one upper magnetically conductive element.

* * * * *

UNITED STATES PATENT AND TRADEMARK OFFICE
CERTIFICATE OF CORRECTION

PATENT NO. : 11,742,137 B2
APPLICATION NO. : 16/471260
DATED : August 29, 2023
INVENTOR(S) : Rudolf Lindt et al.

It is certified that error appears in the above-identified patent and that said Letters Patent is hereby corrected as shown below:

In the Claims

Column 21, Line 26, Claim 15, delete "The secondary-sided arrangement of Claim 14," and insert
-- The method of claim 14, --

Signed and Sealed this
Ninth Day of July, 2024

Katherine Kelly Vidal
*Director of the United States Patent and Trademark Office*